J. C. STRICKLER.
CAN SOLDERING MACHINE.
APPLICATION FILED JUNE 5, 1919.
1,391,867.
Patented Sept. 27, 1921.
3 SHEETS—SHEET 2.
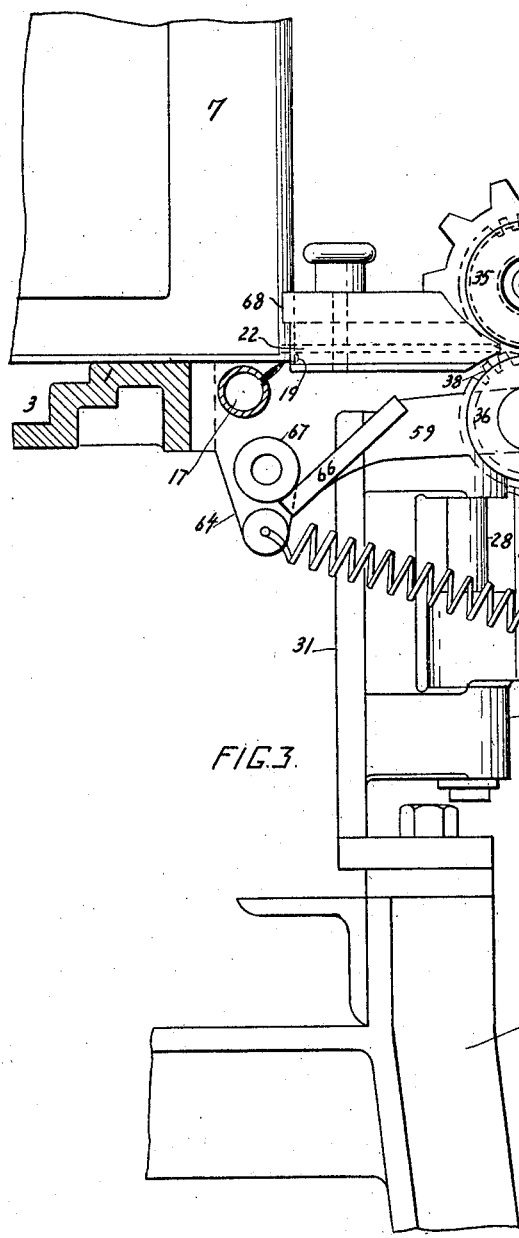
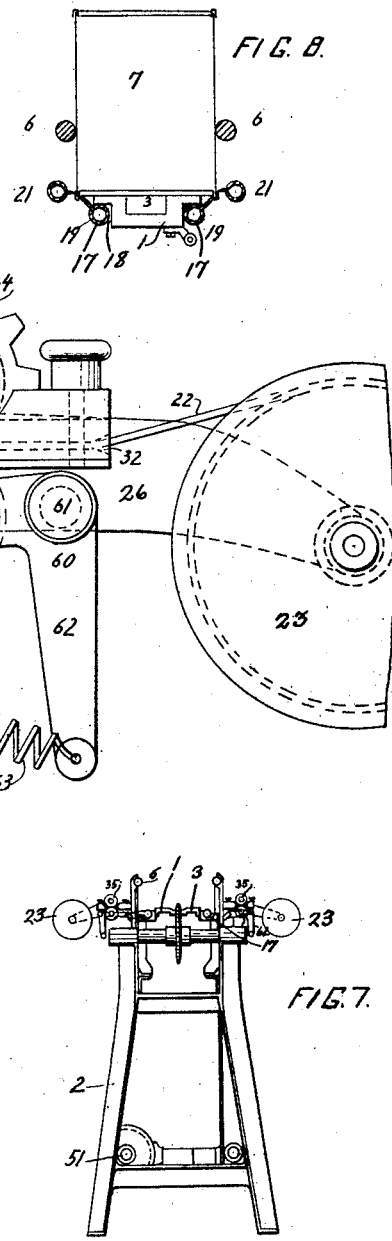
INVENTOR
JOHN C. STRICKLER,
ATT'Y.

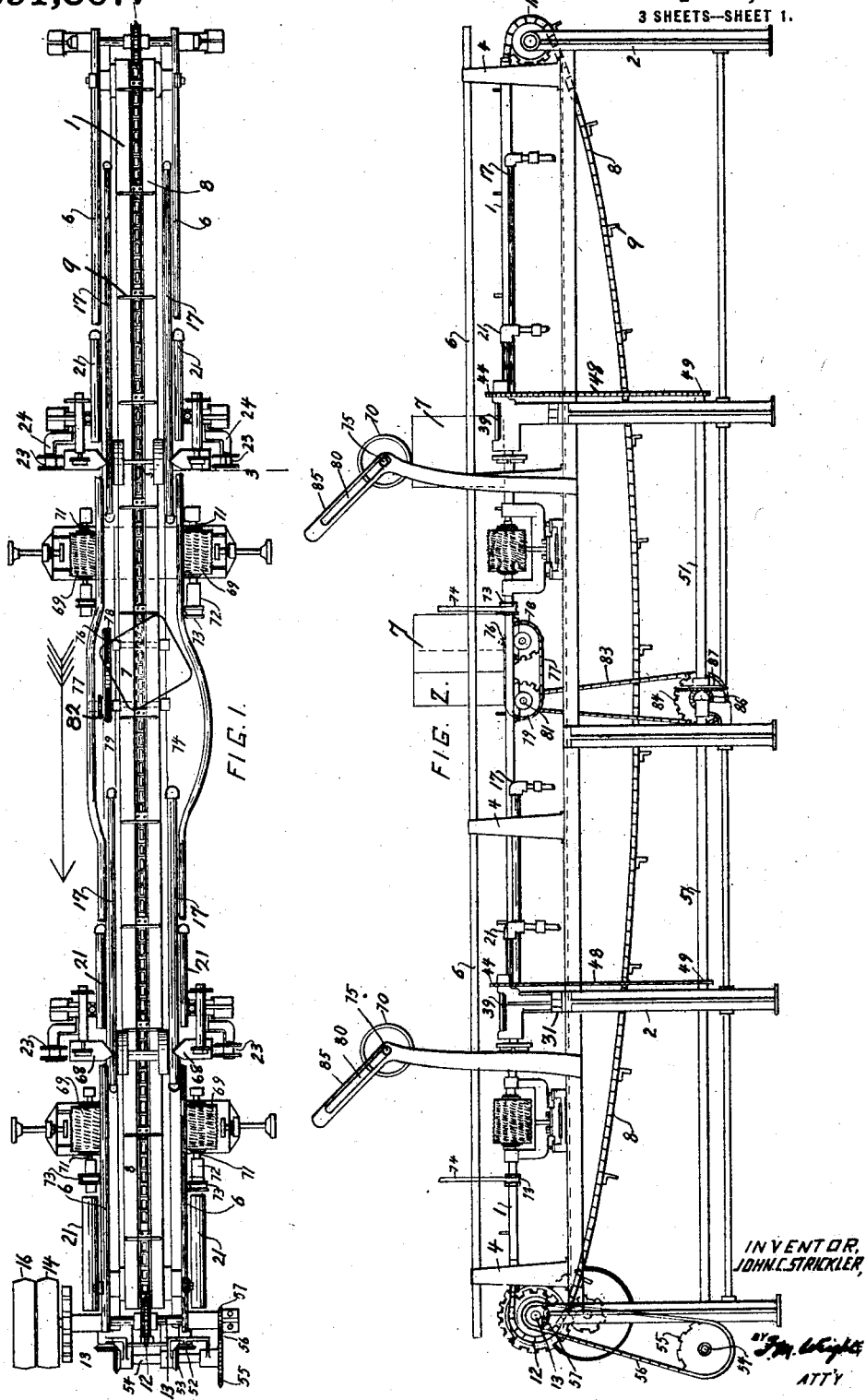

J. C. STRICKLER.
CAN SOLDERING MACHINE.
APPLICATION FILED JUNE 5, 1919.
1,391,867.
Patented Sept. 27, 1921.
3 SHEETS—SHEET 3.
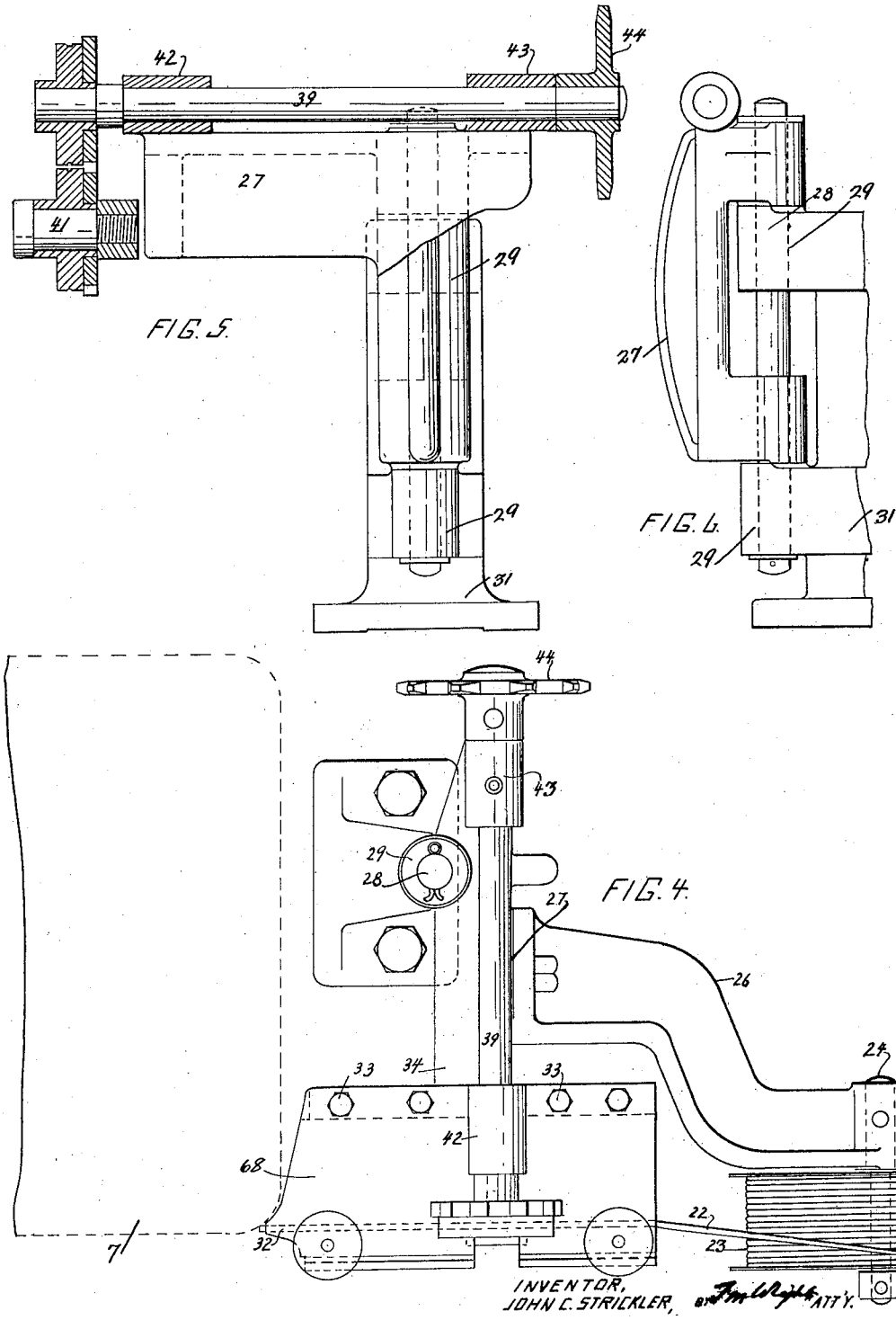

UNITED STATES PATENT OFFICE.

JOHN C. STRICKLER, OF SAN FRANCISCO, CALIFORNIA.

CAN-SOLDERING MACHINE.

1,391,867.  Specification of Letters Patent.  Patented Sept. 27, 1921.

Application filed June 5, 1919. Serial No. 301,880.

*To all whom it may concern:*

Be it known that I, JOHN C. STRICKLER, a citizen of the United States, residing at San Francisco, in the county of San Francisco and State of California, have invented new and useful Improvements in Can-Soldering Machines, of which the following is a specification.

The present invention relates to an improved machine for soldering end seams of cans, which will perform the work automatically and without any manual labor thereon, and which, after soldering two edges of one can end, will turn the can one-quarter turn and then automatically solder thereto the other two edges of said can end.

In the accompanying drawing, Figure 1 is a plan view of my improved machine; Fig. 2 is a side view thereof; Fig. 3 is a cross sectional view on the line 3—3 of Fig. 1 on an enlarged scale; Fig. 4 is a plan view of the major portion of Fig. 3, the dotted line outlining the position of the can in contact with the solder applying feed, the supporting table being omitted; Fig. 5 is a cross section along the line 5—5 of Fig. 3, showing the solder wire feed rolls and driving sprockets; Fig. 6 is an elevation of Fig. 5 disclosing in a better position than in Fig. 5 the hinge on which is mounted the solder feed; Fig. 7 is an end view of Fig. 1 taken from the approach end of the machine, the hold down rolls and supporting standards being omitted; Fig. 8 is a transverse partly diagrammatic sectional view showing the relative position of feed table supporting rails and the pipes for applying heat to the can.

Referring to the drawing, 1 indicates a table top, preferably made of cast iron, supported at suitable intervals upon legs or frame pieces 2, and formed with a central longitudinal depression or groove 3, and with uprights 4 at suitable intervals at the side of the table top, and supporting rails 6. Supported on said table and guided by said rails 6 are can bodies 7, which are advanced on said table top by means of a sprocket chain 8 traveling in said groove 3 and having secured thereto transversely extending pushers 9 of a width slightly less than that of a can body, and traveling between said rails.

The present invention will be illustrated and described in reference to what are known as "square cans", that is, those having can bodies which, between their ends, are of square cross section, but the machine will operate equally as well on cans which, between their ends, are of rectangular cross section, even though not square, and on cans which are of irregular shape.

Said sprocket chain 8 passes around an idle sprocket wheel 11 at one end and a driving sprocket wheel 12 at the other end, said latter wheel being mounted on a shaft 13 carrying fast and loose pulleys 14, 16; or the shaft can, if desired, be driven by intermediate reducing gear from a counter-shaft having the fast and loose pulleys thereon. The can bodies, with the can ends secured thereon, but not soldered thereto, and with the proper flux applied to the joints between the can body and can ends, are supplied to the table at one end and travel thereon in the direction of the arrow in an upright position, one end being supported upon the table. The can travels over the flames of gas issuing from perforations in two pipes 17, immediately underneath the can in recesses 18 in the table, the effect of which flames, which are directed outward against the inner surface of the seam 19 made by the can body with the lowermost can end, is to heat the adjacent portion of the can body in preparation to applying the solder thereto and also to heat the corresponding edges of the can and cause the flux, which has been previously placed thereon, to flow downward.

After the can has traveled in this position for a sufficient length of time, it travels between perforated burner pipes 21 so located that the flames of gas issuing therefrom are directed inwardly and horizontally against the outer surfaces of the adjacent seamed edges of the can body and can end. These pipes are short as compared with the pipes 17, the purpose thereof being to heat the exact place sufficiently in preparation of the application of the solder, so that the solder will be drawn down into the seam.

At the end of the short pipe 21, the can body travels into the portion of the apparatus where the solder is applied thereto. The solder is in the form of wire 22, and is applied from a reel 23, mounted upon a spindle 24 extending parallel with the longitudinal direction of the table from a bracket 26 depending from a frame 27 pivoted near its rear end upon a vertical shaft 28 mounted in bearings 29 depending from a frame 31 attached to one of the supporting frame pieces 2 of the table. The solder wire passes from said reel through a guide 32 secured by screws 33 to an extension 34 of said frame 27, said guide having a tapering end from which the wire emerges, said wire then passing between two gripping rollers 35, 36, formed integral with gear wheels 37, 38, on shafts 39, 41, the shaft 39 being mounted in bearings 42, 43, on the frame 27 and carrying a sprocket wheel 44 around which travels a sprocket chain 48, which also travels around a sprocket wheel 49 on a counter-shaft 51, carrying a bevel gear 52 meshing with a bevel gear 53 on a transverse shaft 54, which carries a sprocket wheel 55 around which travels sprocket chain 56, traveling around a sprocket wheel 57, on the transverse driving shaft 13.

Said solder wire, is, however, prevented from being gripped by said gripping rollers, except when a can is passing, by reason of the gripping roller 36 being mounted on an idle shaft 41, carried by an upwardly extending arm 59 of a bell crank lever 60 mounted upon a shaft 61 journaled in the frame 27, the other arm 62 of which is attached to one end of a stretched coiled spring 63, the other end of which spring is attached to a bracket 64, extending from the frame piece 2 of the table. Said upwardly extending arm 59 carries an inclined plate 66 which impinges against a roller 67 carried on said bracket 64. When, however, a can is passing said soldering mechanism, it impinges against an upper inclined edge of a cam plate 68 attached by screws 33 to the frame 27, and when said can body passes over said edge, it depresses the same, thereby rocking outwardly the front portion of the frame 27 upon its shaft 28, thereby moving outwardly the shaft 61 of the bell crank lever, and causing the roller 67, which is stationary, to engage a more inward portion of the plate 66, thereby permitting the idle shaft 41 of the gripping roller 36 to approach more closely to the shaft 39 of the gripping roller 35, thereby causing the gripping wheels to grip the wire. Said wire so gripped, and fed by the rotary motion of the gripping wheels, is advanced in a guide 32 and passes out at the rear end thereof in close proximity to the end of the can body.

When the cans move on said track to a position adjacent to that at which solder is applied, they are held down on said track by rollers 70 carried by a single shaft 75, the ends of which are contained in upwardly extending grooves 80 in standards 85 supported by the frame of the machine.

As the advancing end of the solder wire contacts with the heated end of the can body, it is melted thereby, and solder is deposited upon a side of said can body in close proximity to the can end as it is advanced past said wire end by the sprocket chain 8. It is understood that there is one such solder wire at each side of the can body and in this way, solder is applied to two opposite sides of the lower end of the can body as it is propelled upon the table top 1 by the chain 8.

After the can leaves the location where solder is applied to each of two opposite sides thereon as above explained, it passes between rotating wipers 69 on shafts 71 rotating in bearings 72 carried by the frame of the machine, said shafts having thereon grooved pulleys 73 rotated by belts 74 extending downwardly from overhead shafts and pulleys, the latter not being shown. The can then travels to a location in which the side guides 6 diverge from each other to form a wide guideway 74, in which a finger 76 extends upwardly from a chain 77 traveling around sprocket wheels 78 and 79, the latter being loose on a shaft 81 and formed integral with a sprocket wheel 82 around which travels a downwardly extending sprocket chain 83 traveling around a sprocket wheel 84 formed integrally with a bevel pinion 86, which meshes with a bevel gear 87 fastened on a shaft 51. The wheels 82, 84, 86, and 87 are so proportioned that the sprocket chain 82 makes a complete cycle during the forward advance of a can through the distance between two cans. During this movement, the finger 76 engages the back of the can near one corner thereof and advances it more rapidly than the main body of the can, and, consequently, imparts thereto a rotation of 90°, so that the unsoldered edges of the can are now those adjacent to the side guides 6. The can then travels between soldering mechanism of precisely the same character as that by which the first edges of the body of the can were soldered so that the other lower edges of the can are also soldered.

While I have herein shown one specific method of applying solder to the can, namely, in the form of a solder wire fed from a reel, my invention is by no means limited thereto, but may be used equally as well if the solder is applied by a method, in which the can body is dipped into molten solder before the end is applied thereto.

A great advantage resides in applying the heating flame from underneath the can, because the solder flows more easily the hotter it becomes, and therefore appears to tend to flow to the hottest point. By heating the can from underneath, the hottest point is the lowest, and, therefore, the solder runs downwardly into the seam of the can body to the can end.

I claim:—

1. In a machine of the character described, the combination of wheels coöperating with each other to grip and advance solder wire, means for movably supporting one of said wheels so that it can be moved to or from the other wheel, means for rotating both of said wheels, irrespective of the position of the last-named wheel, a can track, means for moving cans in succession on said track, and means adapted to be operated by each can in succession for moving said movably supported wheel toward the other.

2. In a machine of the character described, the combination of wheels coöperating with each other to grip and advance solder wire, means for movably supporting one of said wheels so that it can be moved to or from the other wheel, means for rotating both of said wheels, irrespective of the position of the last-named wheel, a can track, means for moving cans in succession on said track, a spring for moving said wheels together, a device for restraining the operation of said spring, and means actuated by the movement of each can in succession for rendering said device inoperative.

3. In a machine of the character described, the combination of a track, pushers for advancing cans in succession on said track, means for applying wire solder to sides of the can closely adjacent to the sides of the track, means, operated in unison with the advancing means, for turning each can through 90°, whereby its sides to which solder has been applied extend transversely to said track, and means, operated in unison with said advancing means, for applying solder to the sides adjacent to said track of said can in its new position.

4. In a machine of the character described, the combination of a track, means for advancing cans in succession on said track, means, operated in unison with the advancing means, for applying solder to sides of the can closely adjacent to the sides of the track, means, operated in unison with the advancing means, for turning each can through 90°, whereby its sides to which solder has been applied extend transversely to said track, and means, operated in unison with said advancing means, for again applying solder to the sides adjacent to said track of said can in its new position, each of said means for applying solder comprising movable elements having edges projecting inwardly from opposite sides of the track to within a distance from each other less than the width of the can and adapted to be engaged by the can in its advance.

5. In a machine of the character described, a track, means for advancing cans in succession on said track, means for applying solder to the cans, an endless belt intermediate the ends of the track and arranged to engage each can as it moves past the belt and means for operating said belt at a greater rate of speed than said advancing means so as to turn the cans while the latter rest upon and are advanced by said advancing means.

6. In a machine of the character described, the combination with a track, of means for advancing cans in succession on said track, means operated in unison with the advancing means for applying solder to certain sides of the cans and additional means operated in unison with the advancing means for applying solder to other sides of the cans, comprising movable elements having edges projecting inwardly from opposite sides of the track to within a distance from each other less than the width of the cans and adapted to engage the cans during the advance thereof.

J. C. STRICKLER.